United States Patent [19]

Aoki et al.

[11] Patent Number: 4,953,385
[45] Date of Patent: Sep. 4, 1990

[54] INFORMATION STORAGE STAMPER AND METHOD OF MANUFACTURING DISKS USING THE SAME

[75] Inventors: Masaki Aoki, Minou; Hideo Torii, Higashiosaka; Kiyoshi Kuribayashi, Neyagawa; Hideto Monji, Katano; Makoto Umetani, Hirakata; Eiji Fujii, Osaka, all of Japan

[73] Assignee: Matsushita Electric Industrial Co., Ltd., Osaka, Japan

[21] Appl. No.: 396,622

[22] Filed: Aug. 22, 1989

[30] Foreign Application Priority Data

Aug. 22, 1988 [JP] Japan ................................ 63-207660
Nov. 18, 1988 [JP] Japan ................................ 63-292685

[51] Int. Cl.$^5$ ............................................. B21D 37/01
[52] U.S. Cl. ...................................... 72/462; 264/107; 425/810
[58] Field of Search ....................... 72/412, 414, 462; 264/107; 425/385, 394, 810

[56] References Cited

U.S. PATENT DOCUMENTS 3,945,240 3/1976 Brown ................................. 72/462
4,565,772 1/1986 Takeoka et al. ..................... 264/107

FOREIGN PATENT DOCUMENTS 158046 9/1982 Japan ................................. 264/107

OTHER PUBLICATIONS

"Optical Video-Disk System", H. Kanamaru; Journal of the Institute of Television Engineers of Japan, vol. 32, No. 1, pp. 15-22, 1978.

"Magneto-Optical Disk Substrate Prepared by Reactive Ion Etching", Kenji Ohta et al.; pp. 77-81, 1985.

*Primary Examiner*—Lowell A. Larson
*Attorney, Agent, or Firm*—Wenderoth, Lind & Ponack

[57] ABSTRACT

On a cemented carbide alloy disk or a cermet disk having been coated with either an iridium (Ir) alloy film or a ruthenium (Ru) alloy film is formed guide grooves by photography or ECR ion etching. The disk thus obtained is used as an optical or magnetic disk stamper. Next, a glass or aluminium disk is placed between a pair of stampers obtained as above and molded under pressure while heating thereby to make guide grooves of an optical or magnetic disk.

8 Claims, 1 Drawing Sheet

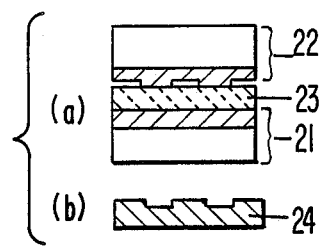
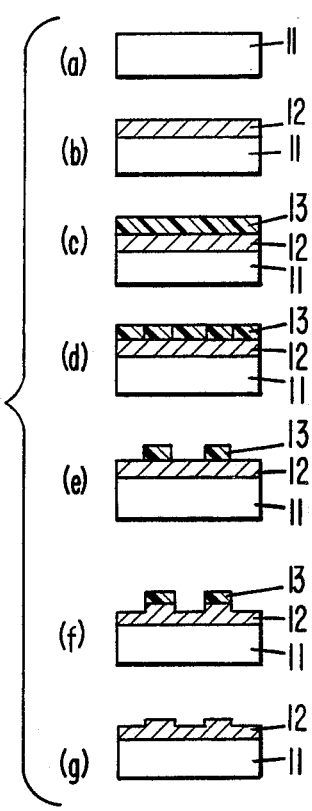

INFORMATION STORAGE STAMPER AND METHOD OF MANUFACTURING DISKS USING THE SAME

BACKGROUND OF THE INVENTION:

1. Field of the Invention

This invention relates to an information storage stamper used for making magnetic disks, optical disks and magneto-optic disks capable of effecting a high-density storage and to a method of manufacturing information storage disks using the same.

2. Description of The Prior Art

One of most important points required for optical disks or magnetic disks is to ensure that date can be reliably stored for a long period of time and that high-speed writing and reading of data can be made stably and reliably in such disks. For this, it is necessary to use an undeformable one as a disk material and preferable to use glass or aluminium (Al). For example, when glass is used as a disk material, it is conventionally general to form guide grooves on a disk by photopolymer method. (See, for example, H. Kanamaru, "Optical Video-Disk System", the Journal of the Institute of Television Engineers of Japan, Vol. 32, No. 1, p.15, 1978).

With the system above referred to, optical disk stampers use a stamper made of nickel, resulting in a low heat resistance. Therefore, it is generally impossible to transfer guide grooves directly to a highly heat-resistant disk made of glass, aluminium or the like. In addition, recently, such a method that guide grooves are formed directly on a glass disk by further improved reactive ion etching method has been also developed. (See, for example, K. Ota, et al., "Vaccum", 28 (2), 77, 1985.)

Processes for forming guide grooves on a typical glass disk will be explained below. After a glass disk has been cleaned, a positive type resist is coated thereon up to a thickness of 200 to 300 nm using a spin coater. After prebaked, an argon laser beam is condensed and the laser beam thus condensed is moved, while the disk is being rotated at a constant speed, in the radial direction of the disk. Thus, a spiral guide groove having a groove width of about 0.8 $\mu$m and a pitch of 1.6 $\mu$m is recorded on the disk. Then, the spiral guide groove is developed and the reactive ion etching is applied thereto with the remaining resist as a mask in the $CHF_3$ gas atmosphere. After the glass disk has been etched up to a depth of about 70 nm, unnecessary resist is made into ashes using oxygen for removal, thus being capable of forming guide grooves on the surface of a glass disk for optical use. This method does not use a stamper, resulting in a low productivity. In addition, magnetic disks generally have no guide groove as with optical disks, which means that the magnetic disks lag behind the optical ones in high track densification.

SUMMARY OF THE INVENTION

An object of this invention is to provide an information storage stamper superior in heat resistance and low in reactivity to glass and aluminium and a method of forming guide grooves on optical or magnetic disks in an extremely small number of processes and yet at a high quality using the stamper.

In order to attain the above-mentioned object, a method of this invention forms guide grooves on a cemented carbide alloy or cermet disk on which a ruthenium (Ru) alloy film or iridium (Ir) alloy film is coated using the photolithography and the electron cyclotron resonance (ECR) ion etching. Then, with this as a stamper for an optical disk or magnetic disk, a glass or aluminium disk is placed between a pair of the stampers having guide grooves formed as above and molded under pressure while heating thereby to pattern the guide grooves for an optical disk or recording signals for a magnetic disk.

That is, the method of this invention is a technique by which glass or aluminium material is, as in press-forming record disks, subjected to a hot press-forming at higher than 350° C. using a pair of stampers having a guide groove pattern for patterning it on the glass or aluminium material. According the method of this invention, the guide grooves can be patterned at a reduced number of processes as well as at a higher accuracy. The reasons why such highly accurate guide grooves can be patterned on a glass or aluminium disk are as follows. An Ir-alloy film or Ru-alloy film coated on a stamper is highly heat-resistant. For example, the melting point of Ni is 1453° C., but those of Ir and Ru are 2440° C. and 2427° C., respectively, which are higher than that of Ni, leading to higher heat resistance.

In addition, as to the reactivity to glass or Al, Ir and Ru are lower than Ni because these are noble metals. Therefore, high quality guide grooves or recording signals can be obtained on a glass or Al disk. Other reasons are attributed to their inertness of being unreactive to glass and Al even at a high temperature and that the ECR ion etching technique can make an extremely accurate stamper.

As explained above, this invention makes possible preparation of an extremely highly heat-resistant and accurate information storage stamper and easy production of optical and magnetic disks made of glass or aluminium having highly accurate guide grooves using the same. Thus, this invention is very effective industrially.

BRIEF DESCRIPTION OF THE DRAWINGS

FIG. 1a to g cross-sectionally shows a manufacturing process of an information storage disk stamper of this invention; and FIG. 2a and b cross-sectionally shows upper and lower stampers arranged for molding a disk and a material to be molded (glass or aluminium disk) placed between the upper and lower stampers.

DESCRIPTION OF THE PREFERRED EMBODIMENTS:

First, a method of manufacturing an information storage disk stamper shown in FIG. 1 will be described.

As shown in FIG. 1 (a), a cemented carbide alloy disk containing tungsten carbide (WC) or chromium carbide ($Cr_3C_2$) or a cermet disk is prepared as a mother disk 11. Thus prepared mother disk 11 is mirror-polished up to a surface roughness below 10 Å on an RMS basis.

Next, an iridium alloy or ruthenium alloy film 12 which is heat resistant and chemically stable is formed thereon at a thickness of 1 $\mu$m or more by sputtering, ion plating or other technique as shown in FIG. 1 (b).

Then, as shown in FIG. 1 (c), a negative type resist film 13 is coatedly formed on the alloy film 12 up to a thickness of 1,000 to 5,000 Å, preferably 2,000 to 3,000 Å, and baked at 50 to 100° C. After pre-baked, an argon laser beam (100 to 500 W) is condensed and moved in the radial direction of the mother disk 11 while the disk 11 is being rotated at a constant speed to set a line width and track pitch on the resist film 13 as shown in FIG. 1 (d), thereby exposing to record a spiral guide groove thereon.

Next, the spiral guide groove thus recorded is developed as shown in FIG. 1 (e). In this case, an exposed resist film is remained due to use of a negative type one. Thereafter, with the remaining resist film 13 as a mask, the iridium alloy or ruthenium alloy film 12 is etched in the atmosphere of an inert gas such as argon or the like by dry etching, preferably by the ECR ion etching technique, as shown in FIG. 1 (f). The depth to be etched will be controlled ranging from 500 to 1,500 Å as required.

Finally, by removing unnecessary resist films, an information storage stamper having a spiral guide groove as shown in FIG. 1 (g) can be manufactured.

Next, a method of manufacturing a disk will be explained with reference to FIG. 2. As shown in FIG. 2 (a), a stamper 21 made as shown in FIG. 1 (b) and an information storage stamper 22 having a spiral guide groove as shown in FIG. 1 (g) are prepared.

A glass or aluminium disk 23 is placed between the both stampers 21 and 22 co-axially with each other as shown in FIG. 2 (a) and heated under application of pressure. After cooled, the glass or aluminium disk 23 is removed therefrom. Thus, a disk 24 having a spiral guide groove can be manufactured as shown in FIG. 2 (b).

EXAMPLE 1

A cemented carbide alloy disk of 90 mm in diameter and 5 mm thick containing WC as the main constituent was prepared and mirror-polished up to a surface roughness of RMS=9 Å as shown in FIG. 1 (a). Then, an iridium alloy was sputtered on the alloy disk thus obtained to form a film having a thickness of 3 μm as shown in FIG. 1 (b).

Next, a negative type resist was coated, as shown in FIG. 1 (c), on the iridium alloy film to form a 2,500 Å thick film and pre-baked at a temperature of 80 °C. After the pre-bake has been completed, an argon laser beam of 300 W was condensed and moved, while the disk is being rotated at a constant speed, in the radial direction of the disk. Thus, a spiral guide groove having a width of 0.8 μm and a pitch of 1.6 μm was exposedly recorded on the disk as shown in FIG. 1 (d). Further next, the spiral guide groove thus exposedly formed was developed, (an exposed resist film was remained due to use of a negative type one in this case), and with the remaining resist film as a mask, the ECR ion etching technique was applied therefor in the argon atmosphere to etch the iridium alloy film up to a depth of 700 Å. (In this case, the negative type resist was almost never etched.) Thus, by removing unnecessary resist, an information storage stamper having a spiral guide groove with a groove width of 0.8 μm, a pitch of 1.6 μm and a depth of 700 μ was steadily manufactured (FIG. 1 (g)). In addition, this Example uses WC as the main constituent of a mother disk, but not limited thereto. Cr3C2 or a cermet can be used for steadily making such a stamper as above.

EXAMPLE 2

An information storage stamper and a stamper having no guide groove was prepared as shown in Example 1. A 90mm-in-diameter and 1.2 mm-in-thickness glass disk whose composition is 73 wt % $SiO_2$, 16.5 wt % $Na_2O$, 1 wt % $Al_2O_3$ 5 wt % CaO and 3.5 wt % MgO was placed between the two stampers prepared as above and heated at 780 °C. under the application of a pressure of 2 kg/cm². After cooled, the glass disk was removed.

Then, an inside diameter hole was bored and evaluation was made superficially and cross-sectionally on the glass disk thus obtained using a scanning electron microscope. The result was that the patterned groove was 0.8 μm in groove width, 1.6 in pitch and 700 Å in depth which were exactly equal to those of the stamper. The surface roughness measured was below 10 Å.

In addition, by rotating this glass disk at 900 r.p.m, measurement was carried out on its signal quality on a CN ratio basis using an optical head. The result was that with the CN ratio in a low frequency range obtained when a glass disk having a mirror surface with a surface roughness below 10 Å was not rotated as the standard (O dB), a reduction in CN ratio of this glass disk was as small as −1.5 dB.

Further in addition, when an aluminium disk was used instead of the glass disk, similarly accurate guide groove was transferred, provided that the aluminium disk was heated at above 500° C. under the application of a pressure of 3 kg/cm². The above-mentioned results are shown at Specimen No. 1 in Tables 1—1 and —2. Molding temperatures and CN ratios in low frequency range obtained when glass compositions are changed are shown indicatively to Specimen Nos. 2 through 7 in Tables 1—1 and —2 (in this case, a noise level of stationary mirror-polished glass disk with a RMS below 10 Å is O dB).

Table 1-1

| | Type of stamper | | |
|---|---|---|---|
| Specimen No. | Material coated on mother disk | Mother material | Molding temperature (°C) |
| 1 | Ir-Pt alloy | WC Cemented carbide | 780 |
| 2 | Ir-Pt alloy | Cermet | 800 |
| 3 | Ir-Os alloy | $Cr_3C_2$ cemented carbide | 800 |
| 4 | Ir-Re alloy | WC cemented carbide | 800 |
| 5 | Ir-Rh alloy | WC cemented carbide | 500 |
| 6 | Ir-Pt alloy | $Cr_3C_2$ cemented carbide | 500 |
| 7* | Ir-Pt alloy | $Cr_3C_2$ cemented carbide | 800 |

Table 1-2

| Specimen No. | Composition of material to be molded (wt%) | | | | | | Signal quality of disk; CN ratio (dB) |
|---|---|---|---|---|---|---|---|
| | $SiO_2$ | $Na_2O$ | $Al_2O_3$ | CaO | $B_2O_3$ | MgO | |
| 1 | 73 | 16.5 | 1 | 5 | | 3.5 | −1.5 |
| 2 | 81 | 4 | 2 | | 12 | | −1.3 |
| 3 | 73 | 16.5 | 1 | 5 | | 3.5 | −1.4 |
| 4 | 75 | 15 | | | 10 | | −1.2 |
| 5 | | | Aluminum | | | | −2.1 |
| 6 | | | Aluminum | | | | −2.5 |
| 7* | 81 | 4 | 2 | | 12 | | −5.6 |

*Specimen No. 7 is a comparative example.
Ir alloy was etched by reactive ion etching.

EXAMPLE 3

As shown in FIG. 1 (a), a cemented carbide alloy mother disk, 90 mm in diameter and 5 mm in thickness, containing tungsten carbide (WC) as the main constituent was mirror-polished to a surface roughness of 8 Å RMS. An alloy containing ruthenium (Ru) at 60 wt % and rhodium (Rh) at 40 wt % was sputtered thereon to form a film of about 4 m thick as shown in FIG. 1 (b).

Next, a negative type resist was spin-coated to form a film of 2,500 Å thick on the alloy film thus obtained as shown in FIG. 1 (c). After pre-baked at 90° C., an argon laser beam was condensed and moved in the radial direction of the disk while the disk was being rotated at a constant speed thereby to record a spiral guide groove of 0.8 μm and 1.6 μm pitch on the spin-coated resist as shown in width FIG. 1 (d). Then, the spiral guide groove thus obtained was developed. (In this case, an exposed resist was remained due to use of negative type one.) Thereafter, the ECR ion etching was applied under the argon atmospheric condition with the remaining resist as a mask for removing all the mask and a part of the ruthenium alloy film. Thus, a stamper for use in making information storage disks was obtained having a spiral groove of about 700 Å on the die surface thereof as shown in FIG. 1 (g).

However, in this example was used cemented carbide alloy as the mother material of a stamper, but not limited thereto. Cermet containing chromium carbide ($Cr_3C_2$) superior in heat resistance and high temperature strength as the main constituent can be used. In addition, as the material to be coated on the mother disk, alloys superior in heat resistance as well as less in reactivity to glass and aluminium, such as Ru-Pt alloy, Ru-osmium (Os) alloy, Ru-Ir alloy and Ru-rhenium (Re) alloy can also be used.

EXAMPLE 4

Stamper for use in making information storage disks and stamper having no spiral guide groove prepared in Example 3 were used as the upper and lower dies in pairs. Next, as shown in FIG. 2 (a), a 90 mm-in-diameter and 1.2 mm-in-thickness glass disk containing SiO2 at 73 wt %, Na2O at 16.5 wt %, Al2O3 at 1 wt %, CaO at 5 wt % and MgO at 3.5 wt % was placed between said pair of stampers 21 and 22, heated at 780° C. and then pressure-molded at 20 kg/cm². After cooled to 500° C., the glass disk 23 having the spiral guide groove patterned was removed therefrom. Thus, a glass disk 24 as shown in FIG. 2 (b) was obtained.

Thereafter, an inside diameter hole was bored and evaluation was made superfacially and cross-sectionally using a scanning electron microscope. The result was that the configuration of the die surface of the stamper was accurately transferred to the surface of the glass disk, that is, a spiral guide groove with a groove width of 0.8 μm, a pitch of 1.6 μm and a depth of 700 Å was patterned on the glass disk. Furthermore, it was recognized that the surface roughness of flat portion of the glass disk was 10 Å on a RMS basis, which means that the die surface of the stamper was accurately transferred to the glass disk surface.

Then, by rotating this glass disk at 900 r.p.m, measurement was carried out on its signal quality on a CN ratio basis using an optical head. The result was that with the CN ratio in a low frequency range obtained when a glass disk having a mirror surface of a surface roughness below 10 Å RMS was not rotated as the standard (0 dB), a reduction in CN ratio of this glass disk was −1.0 dB. When compared with a CN ratio of −11.5 dB obtained when a nickel disk (Specimen No. 13 in Tables 2-1 nd −2) was analyzed for comparison, an extremely good result was obtained.

The above-mentioned result is shown at Specimen No. 1 in Tables 2-1 and −2. Similarly, molding temperatures and CN ratios in low frequency range obtained when the type of a stamper and the composition of a material to be molded were changed are shown indicatively of Specimen Nos. 2 through 12 in Tables 2-1 and −2.

Table 2-1

| Specimen No. | Type of stamper | | Molding temperature (°C.) |
|---|---|---|---|
| | Mother material | Alloy coated on mother disk | |
| 1 | WC cemented carbide | 60 wt% Ru—40 wt% Rh | 780 |
| 2 | WC cemented carbide | 70 wt% Ru—30 wt% Rh | 800 |
| 3 | WC cemented carbide | 70 wt% Ru—30 wt% Os | 800 |
| 4 | WC cemented carbide | 40 wt% Ru—60 wt% Ir | 780 |
| 5 | WC cemented carbide | 50 wt% Ru—50 wt% Re | 780 |
| 6 | $Cr_3C_2$ cermet | 50 wt% Ru—50 wt% Rh | 800 |
| 7 | $Cr_3C_2$ cermet | 40 wt% Ru—60 wt% Os | 800 |
| 8 | $Cr_3C_2$ cermet | 50 wt% Ru—50 wt% Rt | 780 |
| 9 | $Cr_3C_2$ cermet | 70 wt% Ru—30 wt% Re | 780 |
| 10 | WC cemented carbide | 60 wt% Ru—40 wt% Rh | 500 |
| 11 | WC cemented carbide | 40 wt% Ru—60 wt% Ir | 500 |
| 12 | $Cr_3C_2$ cermet | 50 wt% Ru—50 wt% Pt | 500 |
| 13* | | Nickel | 780 |

Note; 13* is a comparative one.

Table 2-2

| Specimen No. | Composition of material to be molded (wt%) | | | | | | Signal quality of disk; CN ratio (dB) |
|---|---|---|---|---|---|---|---|
| | SiO2 | NA2O | Al2O3 | CaO | B2O3 | MgO | |
| 1 | 73 | 16.5 | 1 | 5 | | 3.5 | −1.0 |
| 2 | 81 | 4 | 2 | | 12 | | −1.2 |
| 3 | 81 | 4 | 2 | | 12 | | −1.2 |
| 4 | 73 | 16.5 | 1 | 5 | | 3.5 | −1.0 |
| 5 | 73 | 16.5 | 1 | 5 | | 3.5 | −1.1 |
| 6 | 81 | 4 | 2 | | 12 | | −1.1 |
| 7 | 81 | 4 | 2 | | 12 | | −1.1 |
| 8 | 73 | 16.5 | 1 | 5 | | 3.5 | −1.2 |
| 9 | 75 | 15 | | | 10 | | −1.0 |
| 10 | | | Aluminum | | | | −2.0 |
| 11 | | | Aluminum | | | | −1.9 |
| 12 | | | Aluminum | | | | −2.1 |
| 13* | 73 | 16.5 | 1 | 5 | | 3.5 | −11.5 |

Note; 13* is a comparative one.

As described above, this invention makes it possible to provide an outstandingly reliable and accurate stamper for use in making information storage disks and to easily manufacture optical, magnetic and magneto-optic disks having highly accurate guide grooves using the stamper. Thus, such disks can be supplied economically and in large quantities. Therefore, the effects of this invention on industries are great.

What is claimed is:

1. An information storage disk stamper-comprising a mother disk comprising, a cemented carbide alloy containing a tungsten carbide (WC) or a chromium carbide ($Cr_3C_2$) or a cermet, and an iridium (Ir) alloy film coated on said mother disk and having formed thereon guide grooves for tracking servo.

2. An information storage disk stamper as claimed in claim 1, wherein said iridium alloy film comprises at least one of iridium (Ir)- platinum (Pt) alloy, iridium (Ir)-rhodium (Rh) alloy, iridium (Ir)- osmium (Os) alloy and iridium (Ir)- rhenium (Re) alloy.

3. An information storage disk stamper comprising a mother disk comprising a cemented carbide alloy containing a tungsten carbide (WC) or a chromium carbide ($Cr_3C_2$) as a main constituent or a cermet, and a ruthenium (Ru) alloy film coated on said mother disk and having formed thereon guide grooves for tracking servo.

4. An information storage disk stamper as claimed in claim 3, wherein said ruthenium alloy film comprises at least one of ruthenium (Ru) - platinum (Pt) alloy, ruthenium (Ru) - rhodium (Rh) alloy, ruthenium (Ru) - osmium (Os) alloy, ruthenium (Ru) - iridium (Ir) alloy and ruthenium (Ru)- rhenium (Re) alloy.

5. A method of manufacturing an information storage disk comprising the steps of: heating, a pair of information storage stampers each comprising a cemented carbide alloy or cermet mother disk coated with an iridium (Ir) alloy film; placing a glass or aluminium (Al) disk between said pair of stampers; and applying a pressure to said pair of stampers thereby to transfer a guide groove formed on one of said pair of stampers to said glass or aluminium disk.

6. A method of manufacturing an information storage disk stamper comprising the steps of: spin-coating a negative type resist on a cemented carbide alloy or cermet mother disk coated with a ruthenium (Ru) alloy film; pre-baking the resist; drawing a guide groove pattern, for tracking servo on said resist by either laser beam exposure or electron beam exposure; developing the resist; etching a part of the ruthenium (Ru) alloy film by dry-etching; removing the resist; and removing all the resist and a part of the ruthenium (Ru) alloy film by dry-etching.

7. A method of manufacturing an information storage disk stamper comprising the steps of: spin-coating a negative type resist on a cemented carbide alloy or cermet mother disk coated with an iridium (Ir) alloy film; pre-baking the resist; drawing guide groove pattern for tracking servo by laser-exposure on the resist; developing the resist; etching, the iridium (Ir) alloy film by ECR ion etching; and removing the resist.

8. A method of manufacturing an information storage disk comprising the steps of: placing a glass or aluminium (Al) disk in position between a pair of information storage disk stampers each comprising a cemented carbide alloy or cermet mother disk coated with a ruthenium (Ru) alloy film; heating; and applying a pressure thereby transferring a guide groove formed on one of said pair of stampers on the surface of said glass or aluminium disk.

* * * * *